P. W. MACKENROT.
SALTING MACHINE.
APPLICATION FILED FEB. 21, 1919.
1,339,212.
Patented May 4, 1920.
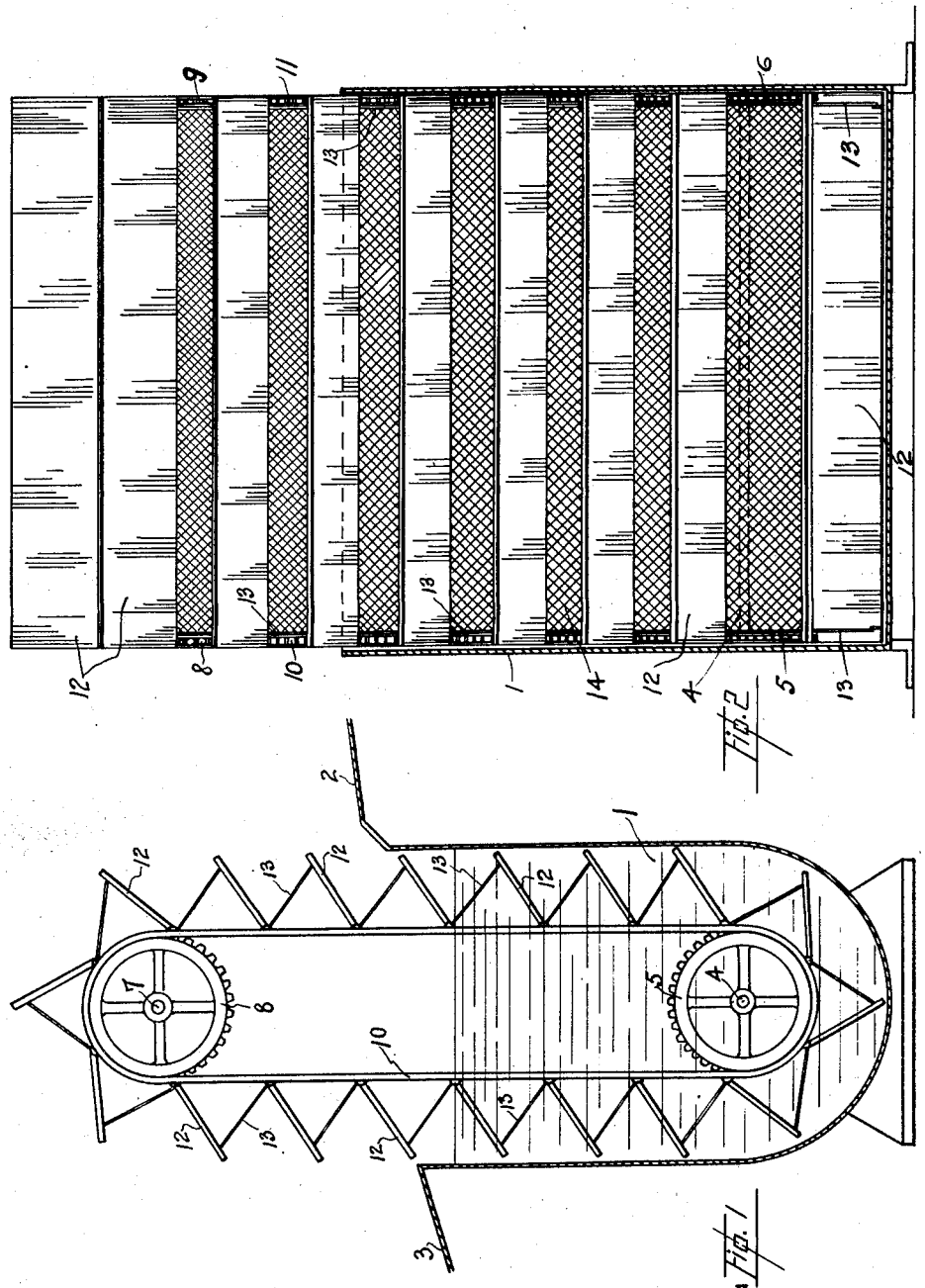

UNITED STATES PATENT OFFICE.

PERCY WILMOT MACKENROT, OF VANCOUVER, BRITISH COLUMBIA, CANADA.

SALTING-MACHINE.

1,339,212. Specification of Letters Patent. Patented May 4, 1920.

Application filed February 21, 1919. Serial No. 278,376.

*To all whom it may concern:*

Be it known that I, PERCY WILMOT MACKENROT, a subject of the King of Great Britain, and a resident of the city of Vancouver, in the Province of British Columbia, Canada, have invented certain new and useful Improvements in Salting - Machines, of which the following is a specification.

My invention relates to improvements in machines for salting fish, and the object of my invention is to devise a means for carrying out the salting operation simply and efficiently and the use of which insures that the fish will be thoroughly and evenly salted when it leaves the machine, which means is inexpensive to construct and install, requires little attention, is economical, and enables a great saving of time and labor to be effected as compared with hand salting.

I attain this object by the construction illustrated in the accompanying drawings in which—

Figure 1 is a side elevation of the machine.

Fig. 2 is a front view.

Similar figures of reference indicate similar parts throughout the views.

1 indicates a tank filled to a suitable level with a brine solution of the proper strength, into the mouth of which tank on one side is led a table 2 while from its opposite side extends a chute 3. Rotatably mounted within the tank near the bottom thereof and extending transversely of the same is a shaft 4 on the ends of which are secured sprockets 5 and 6, while rotatably mounted above the tank at a suitable height is a similar shaft 7 also provided with sprockets 8 and 9, and around the respective pairs of sprockets 5—8 and 6—9 are passed chains 10 and 11, preferably of the link-belt type, which chains are provided with spaced attachments of any suitable design whereby fish carriers 12 may be connected to the chains, as shown in Fig. 2, these carriers being held in an inclined position by means of brace rods 13 also connected to the chains, as shown in Fig. 1. 14 indicates a screen of wire mesh placed behind the chains to prevent the fish from sliding off the carriers into the revolving shaft 4, which screen may be maintained stationary or allowed to travel around with the chains. The sprockets may be rotated by any suitable driving mechanism.

The manner in which the machine operates will be readily understood. The tank 1 being filled with the proper brine solution and the sprockets being rotated to cause the carriers 12 to move in the direction indicated by the arrow in Fig. 1, fish in slices or otherwise passed along the table 2 to drop into the tank will fall on to the carrier which is just below the edge of the table, so that the fish will be carried around through the solution and discharged on to the chute 3, and as the speed of the carriers may be regulated, the fish may be passed through the solution as fast or as slow as desired so that the impregnation may be varied to suit all requirements.

From the foregoing it will be seen that I have provided a means whereby fish may be salted in a simple and efficient manner and which assures positively the attaining of any desired degree of saltness in the fish.

What I claim as my invention is:

1. A salting machine comprising a tank, means for conveying fish from one side of the tank to the opposite side through brine contained therein, said means being adapted to then discharge the fish clear of the tank.

2. A salting machine comprising a tank, an endless conveyer operating therein, said conveyer being provided with carriers adapted to receive fish on one side of the tank and discharge it on the other side after conveying it through brine contained in the tank.

3. A salting machine comprising a brine tank, a shaft rotatably mounted within the tank and a shaft rotatably mounted exteriorly thereof, both said shafts being provided with sprockets on each end, link-belt chains passed around said sprockets, and spaced slats extending between and secured to the respective chains and arranged to form receptacles adapted to receive fish on one side of the tank, pass it through brine contained therein, and discharge it on the opposite side of the tank.

4. A salting machine comprising a brine tank, a shaft rotatably mounted within the tank and a shaft rotatably mounted exteriorly thereof, both said shafts being provided with sprockets on each end, link-belt chains passed around said sprockets, spaced slats extending between and secured to the respective chains and arranged to form receptacles adapted to receive fish on one side of the tank, pass it through brine contained therein, and discharge it on the opposite side of the tank, and a screen disposed behind said slats.

Dated at Vancouver, B. C., this 10th day of February, 1919.

PERCY WILMOT MACKENROT.